United States Patent [19]
Bongards

[11] Patent Number: 6,093,322
[45] Date of Patent: Jul. 25, 2000

[54] PROCESS FOR CONTROLLING THE NITRIFICATION AND DENITRIFICATION PHASE

[75] Inventor: Michael Bongards, Kierspe, Germany

[73] Assignee: WTW Wissenschaftlich-Technische Werkstatten GmbH, Weilheim, Germany

[21] Appl. No.: 09/013,448

[22] Filed: Jan. 26, 1998

[30] Foreign Application Priority Data

Jan. 27, 1997 [DE] Germany .................... 197 02 951

[51] Int. Cl.$^7$ .................................................. C02F 3/30
[52] U.S. Cl. .................... 210/614; 210/630; 210/746; 210/903
[58] Field of Search .................... 210/614, 630, 210/746, 96.1, 143, 903

[56] References Cited

U.S. PATENT DOCUMENTS

| | | | |
|---|---|---|---|
| 5,288,406 | 2/1994 | Stein | 210/614 |
| 5,304,308 | 4/1994 | Tsumura et al. | 210/614 |
| 5,482,630 | 1/1996 | Lee et al. | 210/605 |
| 5,556,536 | 9/1996 | Turk | 210/150 |
| 5,589,068 | 12/1996 | Nielsen | 210/614 |
| 5,624,565 | 4/1997 | Lefevre et al. | 210/614 |
| 5,733,456 | 3/1998 | Okey et al. | 210/605 |
| 5,906,746 | 5/1999 | Helmo et al. | 210/614 |
| 5,942,118 | 8/1999 | Besten | 210/610 |

FOREIGN PATENT DOCUMENTS 396 057 B1  8/1994  European Pat. Off. .

OTHER PUBLICATIONS

Koch et al. "Oxidation–Reduction–Potential–A Tool for Monitoring, Control, and Optimization of Biological Nutrient Removal Systems", Wat. Sci. Tech. vol. 17 Paris, 1985, p. 259–281.

Primary Examiner—Peter A. Hruskoci
Attorney, Agent, or Firm—Cantor Colburn LLP

[57] ABSTRACT

The present invention concerns a process and a device for controlling and regulating the nitrification and denitrification phase in waste water treatment, the redox potential ($U_R$) of the waste water being measured. In a first embodiment, the inflection point of the redox potential is determined statistically. For this a series of measurements of the redox potential are carried out at separate intervals of time, which measurements first are determined and then combined for determining an increase value. The difference between sequential increase values is compared, and a first switch signal (S1) is generated which contains information concerning this result. In a another embodiment, the difference of the redox potential ($U_R$) between maximum and switching off the denitrification phase is determined and compared with the corresponding value of the previous measurement cycle. Depending on the comparison result, a second switch signal (S2) is generated. The switch signals (S1, S2) thus obtained also can be connected via a logic circuit, preferably a fuzzy logic, with one another for issuing switch signals ($S_D$) at least for the ending of the denitrification time.

17 Claims, 1 Drawing Sheet

PROCESS FOR CONTROLLING THE NITRIFICATION AND DENITRIFICATION PHASE

FIELD OF THE INVENTION

The present invention concerns a process for controlling and regulating the nitrification and denitrification phase in waste water treatment. The invention is particularly well suited for use in small and medium-sized purification plants, which operate intermittently with respect to the nitrification and denitrification phase.

BACKGROUND OF THE INVENTION

In the article "Oxidation-Reduction-Potential-A Tool for Monitoring, Control, and Optimization of Biological Nutrient Removal Systems" in WAT. SCI. TECH. vol. 17 Paris 1985, p. 259–281, it is shown that the redox potential is an effective index for the end of the denitrification phase. An inflection point in the time curve of the redox potential, which indicates the end of the denitrification phase, is used for the control. A problem with the use of this value consists in the reliable identification of the inflection point, called the redox inflection point below. Furthermore, the identification is complicated by the fact that the absolute value of the redox potential in the area of the inflection point varies enormously in the case of different framework conditions. In the above-mentioned article, values of 100 to 350 mV are indicated for the absolute value of the redox potential in the area of the inflection point. The absolute value of the redox potential thus cannot be reasonably used for facilitating the identification of the inflection point, although this also is proposed in EP 396 057 B1. The absolute value of the redox potential is used there in addition to the identification of the inflection point. The end of the denitrification phase is assumed when an inflection point has been detected and, additionally, the absolute value of the redox potential is within a predetermined interval. However, from the article indicated above it is obvious that the absolute value of the redox potential fluctuates considerably in relation to the existing framework conditions, because of which this parameter just does not increase the reliability of the identification. A further criterion is seen in EP 396 057 B1 in the absence of oxygen in the waste water. Thus, in addition to the redox inflection point, the absence of oxygen in the waste water also is used as a switch criterion. However, this parameter is also not a reliable index for the end of the denitrification phase, because as a rule the absence of oxygen in the denitrification phase can be relatively early. Thus, switching off too early is excluded by means of this parameter only at the beginning of the denitrification.

SUMMARY OF THE INVENTION

The above-discussed and other problems and deficiencies of the prior art are overcome or alleviated by the process and apparatus of the present invention wherein relatively precise control (at least of the denitrification phase) is made possible on the basis of the identification of the redox potential.

In a first embodiment of the invention, the redox potential is measured at specific intervals, e.g. 10 seconds. Then the increase is determined from a larger number of absolute values, e.g. between 4 and 100. Preferably an average value of the redox potential is measured in each case from at least two absolute values of the redox potential. If this increase value differs from a second increase value, which has been determined from the preceding inflection point, which has been determined in the same way from the preceding measurements, the presence of an inflection point is assumed. The determined increase values of two successive measurements therefore have to differ by a predetermined value in order to validate the assumption of a redox inflection point, and/or the greater the difference is, the higher is the probability for the presence of an inflection point. A first switch signal, which can be used for switching off the denitrification phase, is generated on the basis of this information. The advantage of this process lies in the fact that the determination of the increase value is based on a large number of averaged measurement values over a long period of time, so that inflection points, which are obtained on the basis of short-term measurement signal variation, are not considered. Therefore this quasistatistical process for eliminating possible error signals in the case of detecting the redox inflection point makes a very reliable determination of the redox inflection point possible.

As an alternative, or in addition, to this process, the measured course of the redox potential over time can be evaluated in order to form a difference value. In this case the redox potential is determined at its maximum, that is at the beginning of the denitrification phase, and the difference up to switching off the denitrification phase is determined. This difference is stored in a memory. Then the difference value of the new cycle and the difference value of the old cycle are compared and a second switch signal is issued, which contains information concerning the difference of the difference values from at least two sequential measuring cycles over a period of time. In the case of the use of binary switch signals, a second switch signal can be generated if the difference value of the new measuring cycle exceeds that of the previous measuring cycle by a predetermined value. Either a fixed value, or a variable time value, or the value of the redox inflection point determination according to the first alternative process can be used as the moment for calculating the difference value for the end of the denitrification phase. In the case of both processes it is possible to provide that no measurement signal at all be evaluated at the beginning of the denitrification phase, e.g. in the first three to 15 minutes, since the value of the redox potential fluctuates greatly at the beginning of the denitrification phase. Thus, false measurements because of these fluctuations can be avoided.

In the simplest case these two first and second switch signals can be connected in a logic circuit by means of an AND- or OR-logic, in order to obtain a final switch pulse or a switch signal for farther control. Preferably a fuzzy logic or a neuronal network is used for the switching algorithm. The switch signals are present here as analog values or digital values with a word length of at least two bits, preferably 8 or 16 bits. The first switch signal contains, e.g. a value which specifies the probability for the presence of a redox inflecting point, while the second switch signal can contain information concerning the difference of the difference values of two measuring cycles one after the other. The fuzzy logic or the neuronal network makes it possible to evaluate the plausibility of a signal considered and evaluated with the other signals in order to make a decision according to preliminarily given or self-learned decision models. Thus, e.g. the denitrification phase can be viewed as ended when the probability of the presence of an inflection point is over 90% from the first switch signal, and the second signal indicates simultaneously that the difference of the values from the current and previous measuring cycle is still very small.

Preferably, a basic control for the nitrification and denitrification time is predetermined, which is based on stored nominal values for the nitrification and denitrification time, the nominal values being corrected by loading values statistically or empirically determined and stored loading values for the time of day and/or year and by the waste water temperature. Moreover, this flexible nominal value can be corrected corresponding to the loading of a aeration arrangement during the nitrification phase in a load determining device. This takes place in the following way:

In general a loading measurement of the aeration arrangement is carried out during the nitrification phase in the area of the increase in the partial pressure of oxygen in the waste water. This loading measurement determines either the switching cycles of the aeration arrangement and/or the output with which the aeration arrangement is operated. The loading of the aeration arrangement before reaching the nominal value of the partial pressure of oxygen in the waste water is determined in the first measuring cycle (after starting the unit). Later, that is after the nominal value of the partial pressure of oxygen in the waste water is reached, this loading measurement is carried out once more. The measured values obtained are stored. In the next measuring cycle the loading of the aeration arrangement is measured again before and after the nominal oxygen value in the waste water is reached. If the difference of the values between the current and the previous measuring cycle is positive, the precalculated value for the nitrification time is lengthened, and the corresponding value for the denitrification time is shortened. If the difference is negative, that is if the loading of the aeration arrangement has decreased, the advance value is shortened for nitrification time and lengthened for the denitrification time.

A third comparison circuit which has a time measuring circuit which determines the time from the beginning of the denitrification phase and generates a third switch signal which contains information concerning the difference between the calculated time and the time elapsed in the current denitrification phase now is inserted after this load determining device. In the simplest case with the use of binary switch signals, this can be set, e.g. to HIGH, if the time value which is predetermined and possibly corrected by the loading values by means of the current denitrification time (around a predetermined value) has been exceeded.

The logic circuit already described ends the denitrification phase in relation to the values of these switch signals. They can, e.g., switch off the denitrification phase if one of the three switch signals is positive. However, in the case of a false inflection point identification, this can lead to the denitrification phase being switched off prematurely. Therefore in the case of using binary switch signals, an even greater reliability is reached if switching off takes place only when two of the three switch signals are positive. In this way an erroneous measurement of the redox inflection point does not necessarily lead to the denitrification phase being switched off too early, since in addition to the detected redox inflection point an excess of the difference value of the redox potential from the last measuring cycle must be present or the preset denitrification time must be exceeded. Therefore this makes it possible to avoid having the denitrification phase stop much too early on the basis of an erroneous inflection point identification and thus considerably impairing the output of the purification plant. However, it is advantageous to use a fuzzy logic or a neuronal network which evaluates the switch signals in the way described above and connects them with one another in the way described above. The switch signals preferably are present here as analog signals or as digital signals with greater word length (e.g. 8 or 16 bits).

Based on the foregoing, it will be appreciated that in accordance with the present invention, an essentially greater reliability with respect to the detection of the inflection point itself is reached by means of the improved statistical evaluation of the redox inflection point, in particular in connection with a fuzzy logic or a neuronal network and that a great reliability with respect to a stable process is achieved by means of the additional switch parameters such as redox potential difference and load-dependent time advance, even when no inflection point ever is detected.

The above-discussed and other features and advantages of the present invention will be appreciated and understood by those skilled in the art from the following detailed description and drawing.

BRIEF DESCRIPTION OF THE DRAWING

The single

DESCRIPTION OF THE PREFERRED EMBODIMENT

Figure 1:
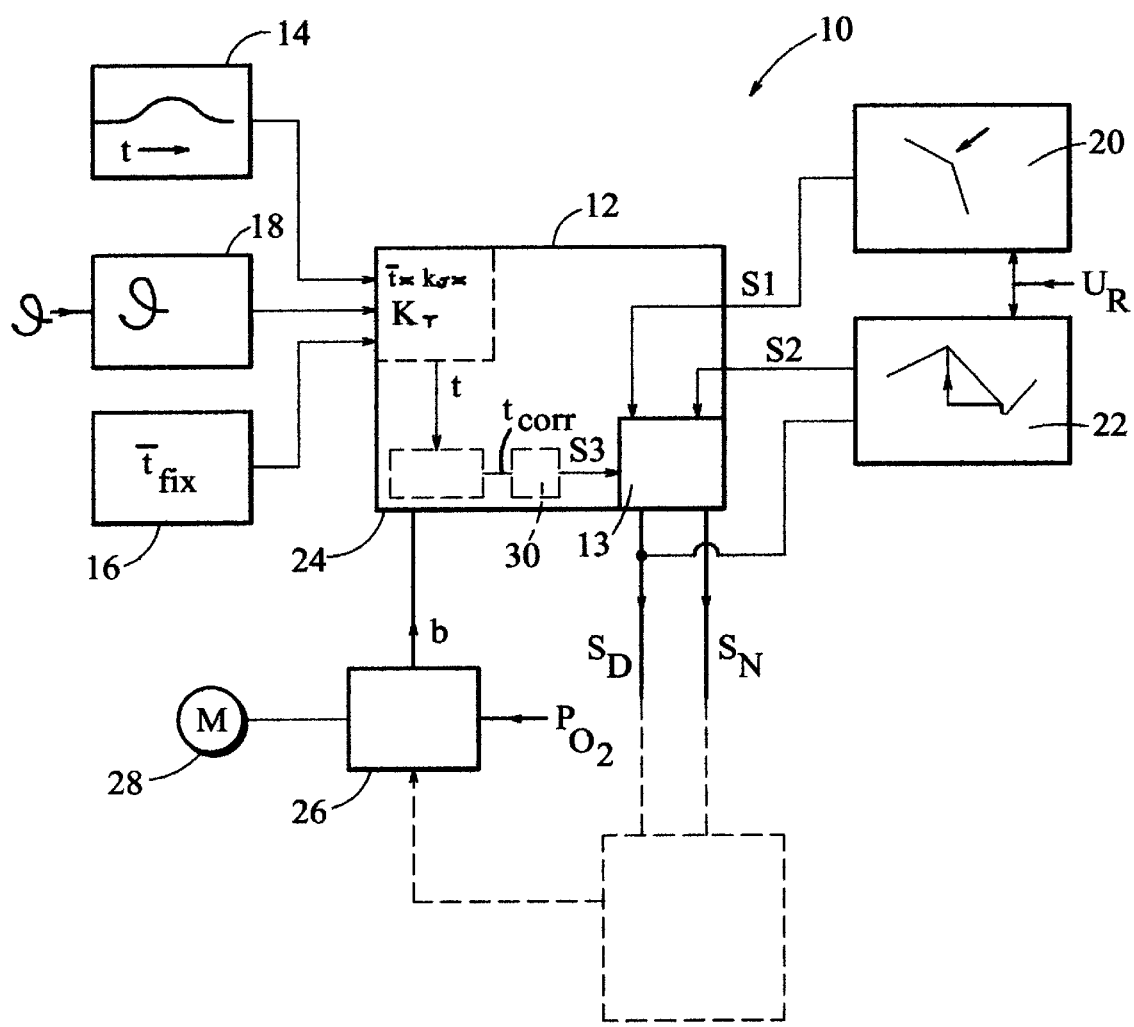
FIG. 1 is a schematic diagram of apparatus and process for controlling nitrification and denitrification in accordance with the present invention.

Referring to FIG. 1, a basic diagram of a control and regulation device in accordance with the invention is shown. The control and regulation device 10 contains a central control logic 12, the outputs of which are a signal $S_D$ for the ending of the denitrification phase and an output signal $S_N$ for the end of the nitrification phase. The central control logic 12 contains a memory 14 in which the loading of the unit dependent on the time of day, and in a given case, time of the year, from a statistical/empirical determination is stored in the form of data sets. Furthermore the unit has a memory 16 which contains an average value for the nitrification and denitrification time from empirical or statistical investigations. This value is connected with a correction value which is obtained from the data memory 14, this correction value taking account of the loading of the unit dependent on the time of day and year. Furthermore, the fixed value from the memory 16 is corrected with a value from a temperature sensor 18 which derives a correction signal which takes account of the temperature-dependent dynamics of the biological or biochemical decomposition process, from the waste water. The calculated time value t is corrected via an optional acquisition unit 24, to be described later, for introducing a load-dependent time correction value into the time value $t_{corr}$ and is transmitted to a comparison circuit 30 which correlates the calculated time value with the time already expired and thus generates a third switch signal S3. Therefore this switch value S3 is based on a predetermined or calculated fixed value t or $t_{corr}$ which takes account of the daily and annual loading, the waste water temperature, and, in a given case, the current loading of the waste water. The switch signal S3 is transmitted to the central logic circuit 13 and taken into account there for deriving the switch points for the ending of the denitrification phase $S_D$ and the nitrification phase $S_N$, In the case of the first measuring cycle after starting the unit, the control of the first nitrification and denitrification time are based only on this value S3. The same obtains for the operation after resetting the unit or after the identification of an error in one of the components 20 to 24 still to be described below, e.g. repeatedly unsuccessful identification of the inflection point in successive measuring cycles.

Furthermore, an inflection point recognition signal circuit 20 which determines an inflection point from the potential curve $W_R=f(t)$ statistically and issues a first switch signal S1 which permits a statement to be made concerning the presence of an inflection point. The first switch signal can be, e.g. a binary signal or an analog or digital signal which contains a measured increase difference in the course of the redox potential over time or a probability value for the presence of an inflection point. Preferably a statistical system of inflection point identification is used for the function of the inflection point identification circuit 20, in the case of which a large number of measured values are obtained and determined over a longer period of time, e.g. 20 minutes, and only the averaged values are used for calculating in increase in the potential curve. The increase values of sequential measurements thus obtained then are compared with one another, which comparison value corresponds to a probability for the presence of an inflection point.

Furthermore, the central control logic is connected with a difference value circuit 22, which in each measuring cycle determines the potential difference between, on the one hand, the maximum of the redox potential at the beginning of the denitrification phase, and, on the other hand, the redox potential at the moment of switching off the denitrification phase, e.g. on the basis of the inflection point identification or the output signal $S_D$ of the logic circuit. Instead of this switch value $S_D$, the switch value S3 (time advance) or S1 (inflection point identification) also could be used. The latter would be advantageous, if in the case of a false inflection point identification the difference value formation would lead to a false result. In this case the denitrification phase could be switched off incorrectly. The difference valuckircuit issues a second switch signal S2, which contains information concerning the difference between the difference values of two sequential measuring cycles, e.g. from the previous and current measuring cycle. In the case of a second switch signal S2, e.g. a HIGH signal can be issued if the difference value from the current measuring cycle is greater than the value from the preceding measuring cycle. However, the signal S2 also can contain information about how greatly the difference value from the current measurement is removed from the difference value from the preceding measurement cycle.

The inflection point identification circuit 20 and the difference value circuit 22 are supplied with the redox potential $U_R$ as the measurement signal. The measurement value is acquired via a commercial probe. In addition, the switch signal $S_D$ of the central control logic 12 or the first switch signal is fed to the difference value circuit 22 for identifying the moments of the ending of the denitrification phase. Thus the difference value circuit 22 is in the position to recognize the end of the denitrification phase and thus to form the difference of the redox potential between beginning and end of the denitrification phase.

It has already been described how a time signal t from a fixed stored average value is connected with a temperature-dependent correction value and a correction value dependent on time of day and year as a default for switching off the unit. This signal t now is corrected by the output signal of a load acquisition device 24 which operates as follows: In the purification unit the partial pressure of oxygen $pO_2$ present in the waste water is determined by the central control 26 of an aeration arrangement 28 which supplies the waste water with air or oxygen. As a rule, this consists of compressors which pump air and/or oxygen under pressure into the waste water, or the aeration arrangement 28 may consists of surface fans. The central control 26 of the aeration arrangement 28 is controlled via the unit control (indicated in the figure as shaded). The load identification device 24 determines the current loading of the aeration arrangement 28 during the nitrification phase once before a set nominal value of the partial pressure of oxygen is reached and once thereafter. In the next measurement cycle these two measurements are carried out again, and a loading difference is obtained from the difference of the corresponding values between the current and the preceding measuring cycle, once before the nominal value of the partial pressure of oxygen is reached and once after the nominal value is reached. These changes in the loading are connected multiplicatively with the time signal t and thus lead to a corrected time signal $t_{torr}$. In the case of a load increase, that is a positive difference of the loading values as compared with the previous measurement cycle, the nitrification phase is lengthened and the denitrification phase is shortened correspondingly. In the case of a decrease in the loading, the nitrification phase is shortened and the denitrification phase is lengthened. This correction of the time value t is carried out only if the unit has a device for determining the partial pressure of oxygen and/or for determining the loading of an aeration arrangement. The load values b obtained from the load determining device 24 are either load values over time, which are obtained from the time intervals for switching the aeration arrangement on and off, or output values, if an output control of the aeration arrangement 28 is present and this output can be determined. Also both types of loading values can be determined and evaluated with one another. The load determining device 24 determines the loading change of the aeration arrangement in comparison with the previous measurement cycle for the first time before the nominal value of the partial pressure of oxygen is reached and thus corrects the time value for the nitrification already at the beginning of the aeration interval. It is particularly advantageous if another measurement of the loading of the aeration arrangement is carried out after the nominal value of the partial pressure of oxygen is reached, and the difference with the previous measurement cycle is determined and the nitrification time is corrected a second time. This verifies if the change in the nitrification time already made as a result of the first loading measurement actually was made or not. The correction of the time value t to $t_{torr}$ made on the part of the load determining device 24 for calculating the switch signal S3 thus takes account of the current loading of the unit in a very advantageous and flexible way.

A third comparison circuit 30, which compares the time value t or $t_{corr}$ with the current denitrification time (DeNi-time), and generates a switch signal S3 in relation to this comparison result, is connected with the load determining device 24. In the simplest case this is a binary signal, e.g. HIGH, if the current DeNi-time is below the calculated time t or $t_{corr}$ (by predetermined value). Otherwise the third circuit signal S3 can contain information concerning the time difference between the precalculated and the current denitrification time, which is evaluated in a suitable way by means of fuzzy or neuro-components.

Thus three switch signal are available to the central control logic for controlling the nitrification and denitrification time:

The first switch signal S1, which is obtained from the inflection point identification circuit 20. This signal depends only on the measured value of the redox potential.

The second switch signal S2, which is obtained from the difference circuit 22. This signal depends on the measured value of the redox potential and the switch value $S_D$ of the central control logic 12 for switching off the denitrification phase or S1 (S3).

The third signal is switch signal S3, which, as described above, depends only on fixed (and previously determined statistically) data and the waste water temperature and, in a given case, an existing determination of the partial pressure of oxygen and/or load determination of the aeration arrangement, also on the actual loading of the unit.

Switch signals S1, S2, and S3 do not necessarily have to be pure binary signals, which indicates the presence of a switch condition, but they can also be analog or digital values which indicate either a statistical probability for the presence of a switch condition or represent a value which indicates the approximation of the current value to the value required for a switch condition.

These three signals now are connected with one another in the logic circuit 13. AND operations are used as logic operations in the case of binary signals whereby the individual switch signals also could be provided with a weighting corresponding to their priority. An OR operation is a further possibility for connecting the three switch signals with an output switch pulse. However a logic operation of this kind is to be rejected since in the case of a false inflection point identification the unit would be switched incorrectly. Preferably at least two of the three switch signals must be present so that the control logic 12 carries out a switch process. In this way a relatively reliable switching is provided since two switch signals independent of one another always must be present so that the control logic also carries out the switch process. These are either the inflection point identification and the exceeding of the redox diffeitnce value in comparison with the preceding measurement cycle or exceeding the time of the precalculated nitrification or denitrification time which is expressed in the switch signal S3. In any case there are at least two positive indices for the presence of an inflection point.

However, the switch signals S1, S2, and S3 can be connected better in a fizzy logic or a neuronal network variably according to unit-specific parameters. The switch signals S1 to S3 present as analog values or digital values with a known word length are evaluated and weighed here. For example, if the difference value of the current measurement cycle as compared with the previous one is very small in the second switch signal S2 and the signal S3 indicates that the predetermined time value has not yet been reached, but the current value is very close to this value, the release of a switch pulse S to the unit control already could take place. Also a switch-off pulse could be sent to the unit control if the probability for the redox inflection point in the first switch signal S1 is extremely high, e.g. over 90%, and the switch-off signal S3 indicates that the denitrification time elapsed in the current measuring cycle does approach the calculated value $t_{corr}$ but has not yet reached it. A control of this kind is very flexible and with respect to its decision logic is close to that of a person who also does not make his decisions on the basis of purely binary YES/NO considerations but as a rule evaluates individual evaluation criteria according to their predictive force and bases his decisions on them. This experience-oriented type of connecting and weighing can be provided to the system in a laboratory-monitored learning process or in a laboratory-monitored automatic learning process (neuronal network) ahead of time.

The switch signals $S_D$ and $S_N$ generated in the logic circuit 13, e.g. a fuzzy logic or a neuronal network for switching off the denitrification or nitrification phase are fed to the central control of the purification unit indicated as shaded.

The units 14, 16, 18, 24, 20, and 22 shown in FIG. 1 outside the control logic of course can be located within the control logic 12. Also it is possible to install individual parts of the control logic 12 separately, such as, e.g. the logic circuit 13. The expert will use or vary the local and/or circuit combination of individual components from FIG. 1 within the framework of his professional ability in relation to unit-specific circumstances.

The unit controls or regulates not only the denitrification time, but, via the switch signal S3, also the nitrification time. The process is designated as a control or regulation process since the switch signals S1 and S2 regulate the unit, the third switch signal S3 can control the unit only if there is no loading measurement. It is controlled via the third switch signal S3 in each case during the first measurement cycle if comparison values have to be stored only from the measurement cycle. As a rule it is controlled via the switch signal S3 even when one of the components 20, 22 or the probe for determining the redox potential has to be serviced or no results or unclear results, e.g. in the difference value or inflection point identification, were obtained over several measurement cycles.

The control or regulation also can be used for units which do not have determination of the partial pressure of oxygen or in the case of which the loading of the aeration arrangement is not determined by means of optional omission of the components 24, 26, and 28.

The central unit control to which the switch pulse $S_D$ and $S_N$ for the denitrification and nitrification time are fed is shown in dashed lines in FIG. 1 since it is not necessarily required by the present invention. As a rule, this unit gives a switch pulse to the control 26 for the aeration arrangement 28 at the beginning and at the end of the nitrification time. However, this pulse also can be issued via the control logic 12. The control logic 12 can be part of the unit control, but preferably it is provided separately and suited for reequipping existing units.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process for controlling and regulating a nitrification and denitrification phase in a waste water treatment, the process comprising:

measuring a redox potential ($U_R$) of the waste water, the redox potential including an inflection point which is used for indication of the end of the denitrification phase;

calculating an increase from at least two measurements of the redox potential, the at least two measurements being separated in time;

storing the at least two measurements;

comparing at least two sequential increase values of the redox potential with one another;

generating a first switch-off signal (S1) based on the comparison between the at least two sequential increase values, the first switch-off signal for switching off the denitrification phase;

detecting a maximum of the redox potential;

detecting the redox potential for a period of time at a point where the denitrification phase is switched off;

calculating a difference between the maximum redox potential and the redox potential for the period of time, the difference being representative of a present detection cycle;

comparing the difference of the present detection cycle with the difference calculated in a previous detection cycle; and generating a second switch-off signal (S2) based on the comparison between the difference between the present and previous detection cycles, wherein the first and second switch-off signals (S1, S2) are used for switching off the denitrification phase.

2. The process in accordance with claim 1, wherein an average value is formed from at least two measured values of the redox potential, and the increase is calculated from a predetermined number of average values.

3. The process in accordance with claim 2, wherein a first average increase value is calculated from a predetermined number of sequential increase values determined at uniform intervals of time, the first average increase value being compared with a subsequent second average increase value calculated in the same way as the first average increase value, the first switch-off signal (S1) being generated based on the a comparison between the first and second average increase values.

4. The process in accordance with claim 1, further including:

measuring the time since detecting a maximum value of the redox potential or since measuring a beginning of denitrification;

calculating a present denitrification phase time; and generating a third switch-off signal (S3) for switching off the denitrification phase, the third switch-off signal (S3) being based on how greatly the present denitrification phase time deviates from a predetermined or calculated time ($t_{corr}$).

5. The process in accordance with claim 1, wherein fuzzy logic is used to weigh at least one of the first and second switch-off signals (S1, S2) on the basis of a statistical truth value or its statistical probability or reliability, the denitrification phase being switched off depending upon the weighing.

6. The process in accordance with claim 1, wherein a beginning of the denitrification phase is determined with respect to time and no measured values of the redox potential can be evaluated within a predetermined time span from the beginning of the denitrification.

7. The process in accordance with claim 1, further including:

measuring an oxygen content ($p_{o2}$) of the waste water;

measuring a current degree of loading of an aeration arrangement before a preset $P_{o2}$ in the waste water is determined;

calculating a difference between the current degree of loading and a corresponding value of a previous degree of loading of a previous cycle; and wherein a fixed value (t) for nitrification time is lengthened or shortened ($t_{corr}$) corresponding to a positive/negative difference.

8. The process in accordance with claim 1, further including:

measuring an oxygen content ($P_{o2}$) of the waste water;

measuring a current degree of loading of an aeration device after a preset $P_{o2}$ nominal value in the waste water is reached, the current degree of loading corresponding to the nominal value;

calculating a difference between the current degree of loading and a corresponding value of a previous degree of loading of a previous cycle; and wherein a fixed value (t) for nitrification times is lengthened or shortened ($t_{corr}$) corresponding to a positive/negative difference and the denitrification time is shortened or lengthened ($t_{corr}$) corresponding to the positive or negative difference.

9. The process in accordance with claim 8, wherein when no inflection point in the increase in the redox potential is determined in a measuring cycle, a denitrification time is determined from a preset fixed value (t), which fixed value takes account of a unit-specific stored loading factor dependent upon a time of day and a temperature of the waste water, and the measured values of the redox potential and/or the degree of loading of an aeration arrangement in the measurement cycle are stored again for comparison measurements and difference formations in later measurement cycles, and the fixed value (t) is changed corresponding to differences in the current degree of loading of the aeration arrangement and the value of the previous measurement cycle ($t_{corr}$).

10. The process in accordance with claim 1, wherein in a first measurement cycle a nitrification and denitrification time are determined from a predetermined fixed value, which fixed value takes account of a unit-specific stored loading factor dependent upon a time of day and a temperature of the waste water, and at least one of (1) measured values of the redox potential and (2) a degree of loading of an aeration arrangement for comparison measurements with difference value formations in later measurements cycles being stored in a first measuring cycle.

11. The process in accordance with claim 1, wherein when no inflection point in the increase in the redox potential is determined in a measuring cycle, a denitrification time is determined from a preset fixed value (t), which fixed value takes account of a unit-specific stored loading factor dependent upon a time of day and a temperature of the waste water, and the measured values of the redox potential and/or the degree of loading of an aeration arrangement in the measurement cycle are stored again for comparison measurements and difference formations in later measurement cycles.

12. A process for controlling and regulating a nitrification and denitrification phase in a waste water treatment, the process comprising:

measuring a redox potential ($U_R$) of the waste water, the redox potential including an inflection point which is used for indication of the end of the denitrification phase;

calculating an increase from at least two measurements of the redox potential, the at least two measurements being separated in time;

storing the at least two measurements;

comparing at least two sequential increase values of the redox potential with one another;

generating a first switch-off signal (S1) based on the comparison between the at least two sequential increase values, the first switch-off signal for switching off the denitrification phase;

measuring oxygen content of the waste water for controlling an aeration arrangement for introducing oxygen into the waste water;

determining at least one of time and output-related loading of the aeration arrangement; and using the at least one of the time and output-related loading for calculating a nitrification time and a denitrification time.

13. The process in accordance with claim 12, further including:

measuring the time since detecting a maximum value of the redox potential or since measuring a beginning of denitrification;

calculating a present denitrification phase time; and generating a third switch-off signal (S3) for switching off the denitrification phase, the third switch-off signal being based on how greatly the present denitrification phase time deviates from a predetermined or calculated time ($t_{corr}$).

14. The process in accordance with claim 13, wherein fuzzy logic is used to weigh at one of the first, second and third switch-off signals (S1, S2, S3) on the basis of a statistical truth value or its statistical probability or reliability, the denitrification phase being switched off depending upon the weighing.

15. The process in accordance with claim 13, wherein binary signals are generated from the switch-off signals by comparison with threshold or nominal values, and the denitrification is switched off when at least one of the first, second, and third switch-off signals (S1, S2, S3) is present.

16. The process in accordance with claim 15, wherein the denitrification is ended when two of the three switch-off signals (S1, S2, S3) are present.

17. A process for controlling and regulating a nitrification and denitrification phase in a waste water treatment, the process comprising:

measuring a redox potential ($U_R$) of the waste water, the redox potential including an inflection point which is used for indication of the end of the denitrification phase;

calculating an increase from at least two measurements of the redox potential, the at least two measurements being separated in time;

storing the at least two measurements;

comparing at least two sequential increase values of the redox potential with one another;

generating a first switch-off signal (S1) based on the comparison between the at least two increase values, the first switch-off signal for switching off the denitrification phase;

using fuzzy logic to weigh the first switch-off signal (S1) on the basis of a statistical truth value or its statistical probability or reliability; and switching off the denitrification phase depending upon the weighing.

* * * * *

UNITED STATES PATENT AND TRADEMARK OFFICE
CERTIFICATE OF CORRECTION

PATENT NO. : 6,093,322
DATED : July 25, 2000
INVENTOR(S) : Michael Bongards

It is certified that error appears in the above-identified patent and that said Letters Patent is hereby corrected as shown below:

<u>Column 2,</u>
Line 47, after "for" delete "farther" and insert therefor -- further --

<u>Column 5,</u>
Line 29, after "difference" delete "valuckir-cuit" and insert therefor -- value circuit --

<u>Column 7,</u>
Line 27, after "redox" delete "diffeitnce" and insert therefor -- difference --
Line 34, after "a" (first occurrence) delete "fizzy" and insert therefor -- fuzzy --

<u>Column 10,</u>
Line 1, after "nitrification" delete "times" and insert therefor -- time --

Signed and Sealed this

Tenth Day of February, 2004

JON W. DUDAS
*Acting Director of the United States Patent and Trademark Office*